Sept. 30, 1941.  R. W. BAILEY  2,257,217
ASSEMBLING MACHINE
Filed April 11, 1940   4 Sheets-Sheet 3

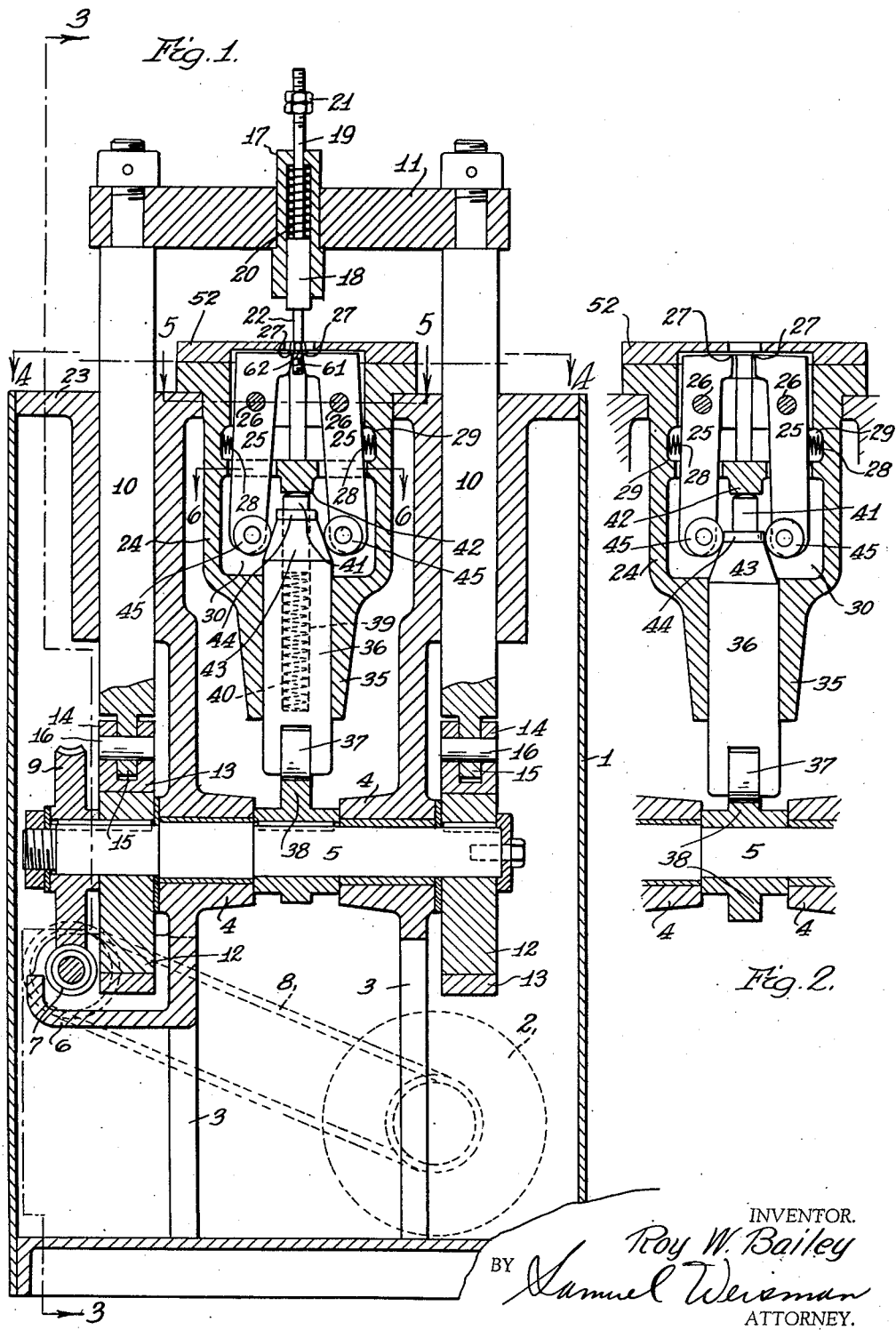

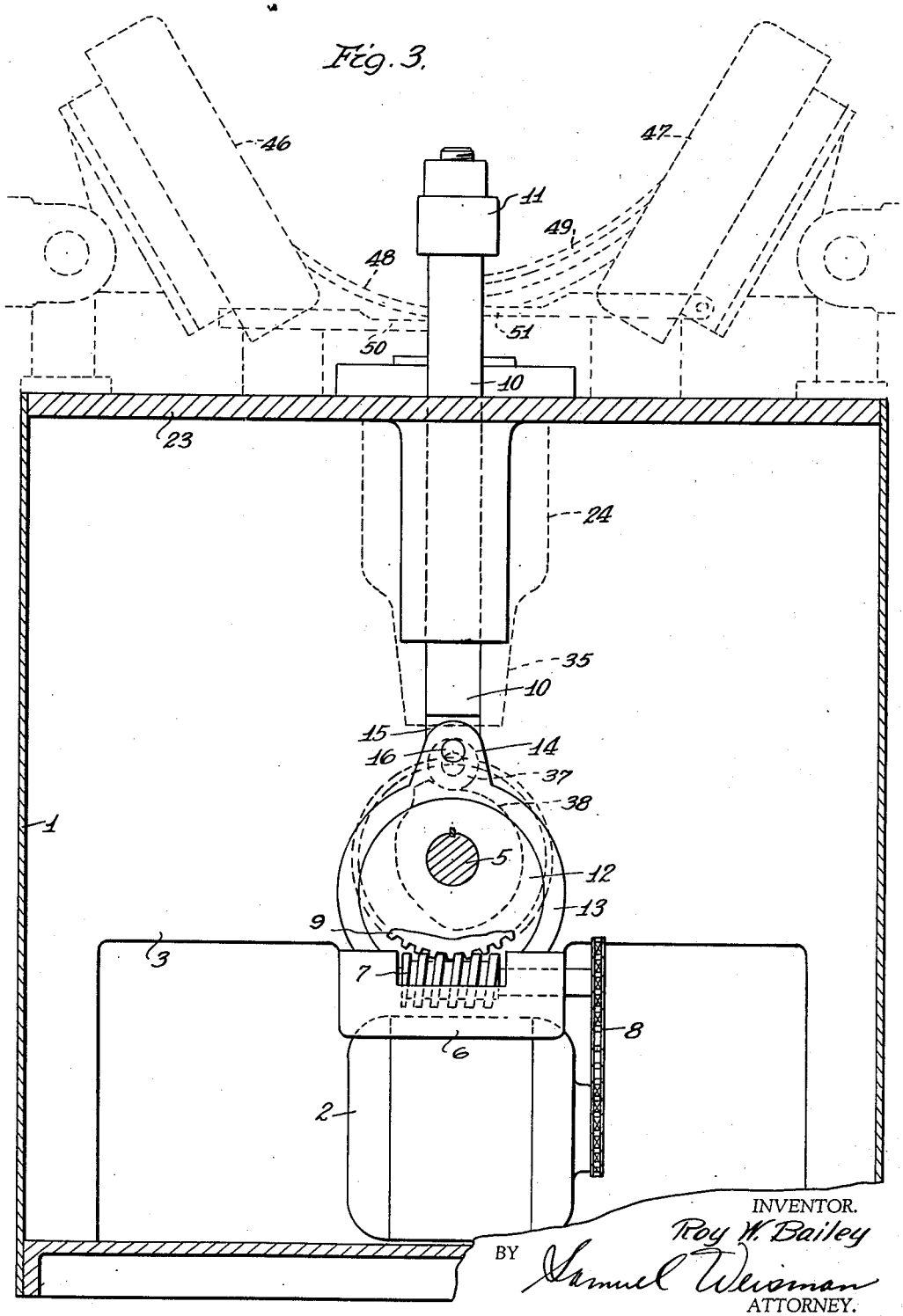

INVENTOR.
Roy W. Bailey
BY Samuel Weisman
ATTORNEY.

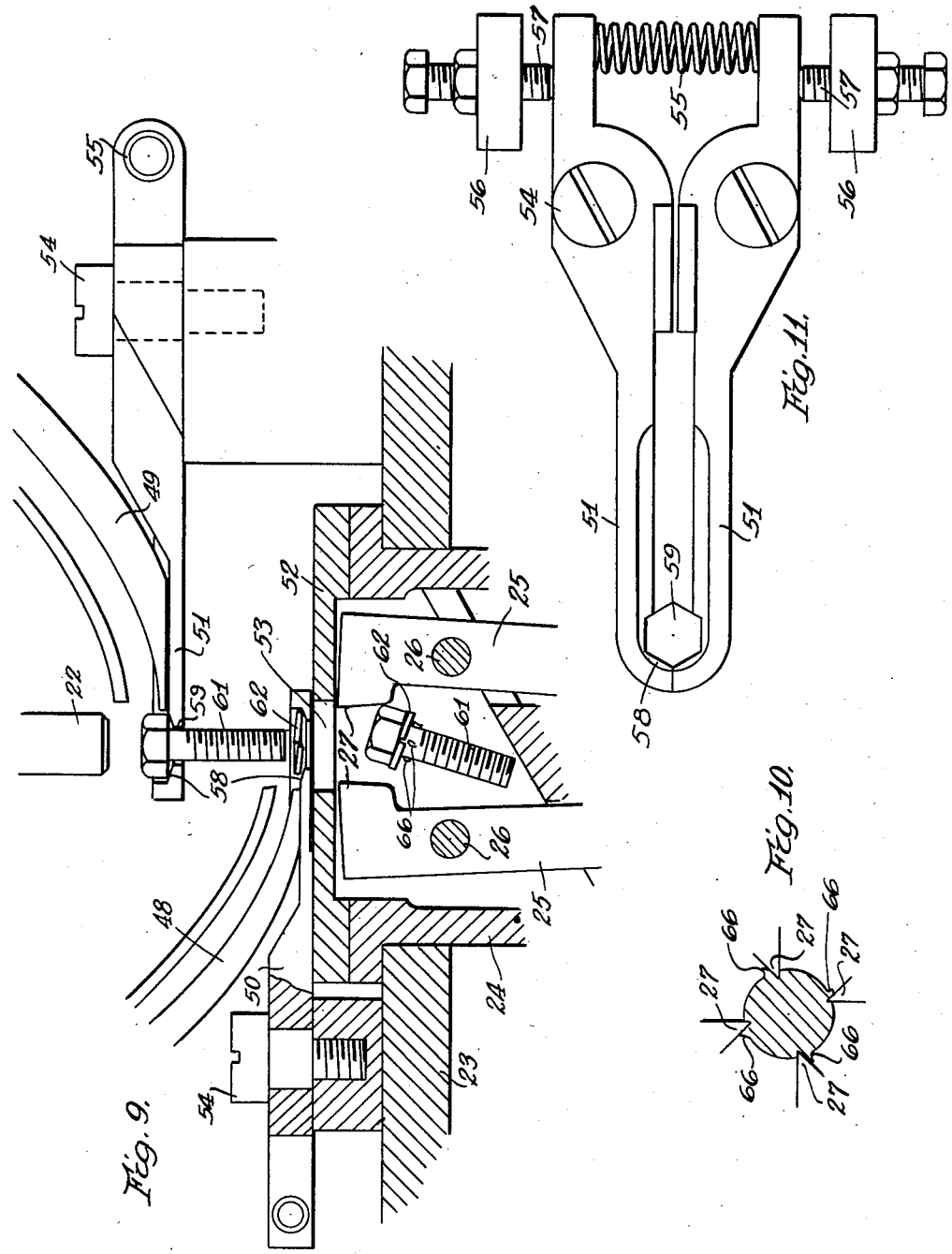

Patented Sept. 30, 1941

2,257,217

UNITED STATES PATENT OFFICE 2,257,217

ASSEMBLING MACHINE

Roy W. Bailey, Detroit, Mich., assignor to Detroit Power Screwdriver Company, Detroit, Mich., a corporation of Michigan Application April 11, 1940, Serial No. 329,123

4 Claims. (Cl. 29—84)

The present invention pertains to a novel assembling machine, particularly for assembling washers on screws or bolts and distorting the screw or bolt so that the washer does not slip off in the subsequent handling of the material.

According to present practice, the washers are mounted on the screws by hand and the assemblies placed in a receptacle for delivery to the next operation. During this interval, and particularly during transportation and handling, a considerable number of the washers slip off the screws and required an additional amount of labor in being replaced.

The object of the present invention is to overcome these difficulties, first, by providing a machine for inserting the screws in the washers and, second, providing a means in the machine for distorting the shank of the screw below the washer in such a manner that the latter cannot slip off. According to the invention, the machine includes a set of pivotally mounted cutters or jaws upon which the washers are delivered one at a time. A suitable delivery device brings a screw over the washer, and a pusher then drives the screw through the washer. The machine then actuates the cutters against the screw, just below the washer, so that lugs or burrs are formed in the shank of the screw. The burrs serve as stops that hold the washer against sliding. In the continued operation of the machine, the cutters spread apart and the pusher moves the assembled screw and washer between the cutters to a delivery chute. The latter carries the assemblies to a receptacle or to a feeding device serving a screwdriving machine.

The pusher and the cutters are operated by separate cams designed and positioned to actuate these parts in proper sequence. The cams are preferably mounted on one shaft and driven by an electric motor through a suitable drive.

Figure 1 is a vertical section of the machine;

Figure 2 is a detail section in the same place, showing the parts in a different position;

Figure 3 is the section on the line 3—3 of Figure 1;

Figure 9 is a detail section at right angles to Figure 1, showing the jaws in a different position;

Figure 10 is a cross section of a screw at the shank, showing the burrs, and viewed in bottom plan, and Figure 11 is a plan view of the screw holder shown in elevation in Figure 9.

Reference to these views will now be made by use of like characters which are employed to designate corresponding parts throughout.

Figure 4:
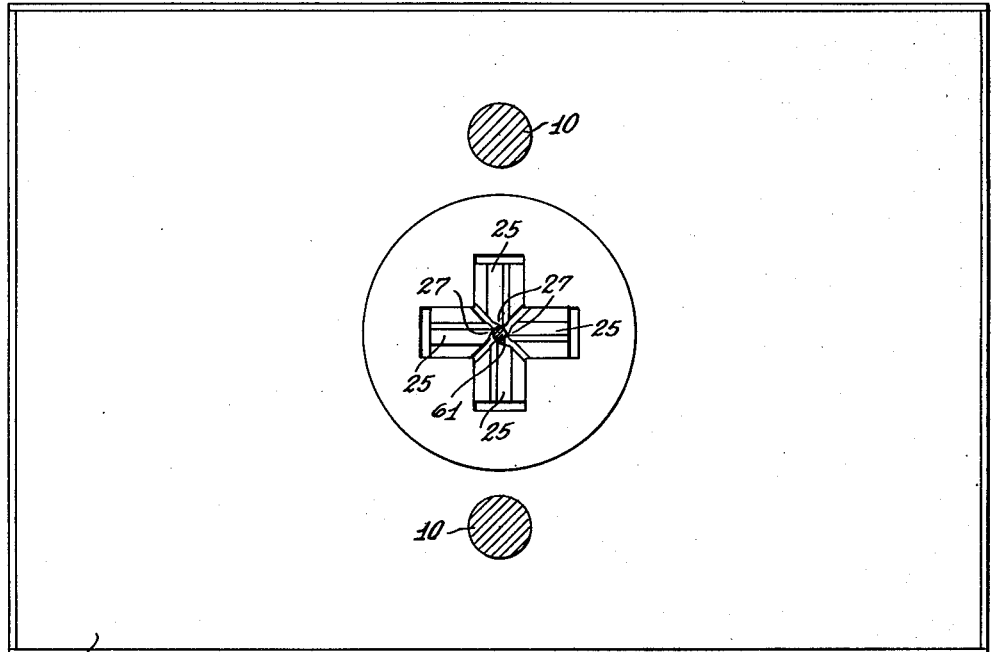
Figure 4 is the section on the line 4—4 of Figure 1.

The machine is built within a housing 1 on the base of which is mounted an electric motor 2. Also mounted on the base is a pair of standards 3 formed with bearings 4 for a cam shaft 5. On one of the standards is formed a bracket 6 in which is journaled a worm 7 driven from the motor through a chain 8 or other suitable means. The worm meshes with a worm gear 9 on one end of the shaft 5.

Each of the standards 3 is adapted to guide a rod 10 in a vertical path. The upper ends of the rods are joined by a cross head 11 for a purpose that will presently appear. The shaft 5 also carries an eccentric disk 12 beneath each rod 11 and surrounded by a crank 13 rotatable thereon. Each crank has a forked portion 14 receiving the reduced lower end 15 of the adjacent rod 10 and pivotally connected thereto by a pin 16. It will now be evident that the rods 10 are reciprocated on rotation of the shaft 5.

The cross head 11 carries an inverted thimble 17 in which is slidably mounted a plunger 18 from which a reduced stem 19 extends slidably through the top of the thimble. Between the latter and the body of the plunger is inserted a compressed spring 20 tending to move the plunger downward. The outer end of the stem 19 carries a suitable stop 21 to limit the downward movement of the plunger. The plunger has a reduced lower or working end 22 which serves as a pusher, as will presently appear.

Figure 5:
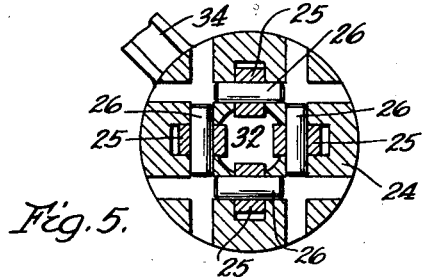
Figure 5 is the section on the line 5—5 of Figure 1.
Figure 6:
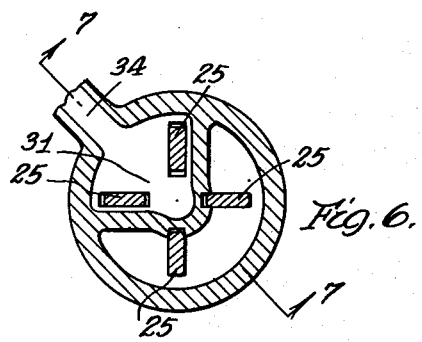
Figure 6 is the section on the line 6—6 of Figure 1.

The standards 3 may be formed with an integral overall top member 23, and in the latter is mounted a suspended block or casting 24. This member is shaped to support four jaws 25 in vertical planes successively perpendicular to each other on pivot pins 26, the axis of which form a rectangle, as may be seen in Figure 5. The upper inner end of each jaw is formed with a cutting edge 27, as shown in Figure 4. Each jaw is engaged below its pivotal axis by a spring 28 mounted in a seat 29 formed in the block 24. These springs tend to retract the jaws from the common center about which they are grouped.

Figure 7:
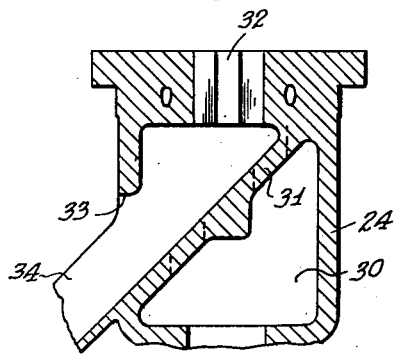
Figure 7 is the section on the line 7—7 of Figure 6.
Figure 8:
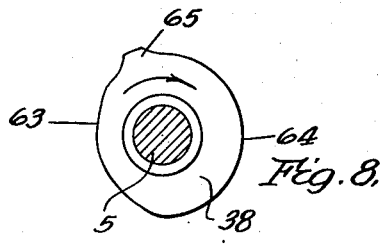
Figure 8 is the detail elevation of the cutter operating cam.

The member 24 is formed with a substantial cavity 30, as shown in Figure 7, across which is formed a diagonal floor 31 for a purpose that will presently appear. Through the top of the member 24 is formed an opening 32 receiving the upper inner ends of the jaws 25 and from which articles may drop upon the floor 31. Such articles pass through an opening 33 in the side of the member 24 and to a chute 34 by means of which they are delivered to a suitable receptacle outside of the machine.

From the bottom of the member 24 extends a boss 35 in which is slidably mounted a ram 36 directly over the shaft 5. In the lower end of the ram is mounted a roller 37 riding on a cam 38 secured to the shaft 5. The ram is bored at 39 from the upper end to receive a coil spring 40 on which is mounted a pin 41 bearing against a stop 42 formed on the lower surface of the floor 31. By this means the roller 37 is maintained at all times in contact with the cam 38.

The upper end of the ram is formed as a conical shoulder 43 terminating in a neck 44 at the upper extremity. The lower end of each jaw 25 carries a roller 45 adapted to engage the shoulder and the neck under the action of the springs 28 during the vertical movement of the ram by the cam 38.

At the top of the machine are mounted a pair of hoppers 46 and 47 adapted to deliver the work pieces in proper alignment to tracks 48 and 49 respectively leading to supports or pairs of fingers 50 and 51 mounted one above the other in the common center line about which the jaws 25 are grouped. The hoppers may be constructed as in the patents to Frank H. Dellaree, No. 2,025,273, of December 24, 1935, and No. 2,062,182 of November 10, 1936, while the fingers or supports may be constructed as shown in the patents to Frank H. Dellaree, No. 1,813,697 of July 7, 1931, No. 1,862,845 of June 14, 1932, or No. 1,866,880 of July 12, 1932. The hopper 46 may contain washers, and the hopper 47 may contain screws or studs to be passed through the washers. A plate 52 is mounted upon the body 24 and has an opening 53 co-axial with the member 22 and large enough to pass a screw head and washer.

Both pairs of fingers 50, 51 are assembled and operated in the same manner, and one such pair will be described. Each finger is mounted on a pivot 54, and a coil spring 55 is inserted between the ends that are remote from the axis of the member 22. On the outer side of each remote end is a fixed member 56 through which is screwed a stud 57 engaging the end. By this means the remaining ends can be stopped before contacting each other, for a purpose which will presently appear.

The free ends, or those positioned in line with the member 22, are formed with a downwardly sloping seat 58 shaped to receive the head of the screw in the case of the upper fingers 51 and to receive the washer in the case of the lower fingers 50. The bottom of the seat is open at 59, and when pressure is applied on the seated member through the plunger 22, the fingers are forced apart sufficiently to permit the seated member to pass therebetween, as illustrated in Figure 9. The vertical distance between the seats is slightly greater than the length of the shank of the screw.

In the operation of the device, assuming that the tracks 48 and 49 are loaded with washers and screws tending to gravitate to their respective seats, the head 11 is first raised as in Figure 9, sufficiently to permit the head of screw 61 to take a position beneath the pusher 22 and directly in line with the hole in the seated washer 62. The cutting edges 27 are spaced apart the maximum distance to permit the previously treated screw and washer to fall. The rollers 45 at this time engage the narrowest portion 44 of ram 36, the roller 37 of which is on the short radius arc 63 of cam 38. The pusher 22 then inserts the screw into the washer, as Figure 1, while the ram roller 37 is next engaged by the larger radius arch 64 and finally by the abrupt rise 65 on the cam 38. The rollers 45 are thereby engaged successively by the shoulder 43 and the body of ram 36 to drive the cutting edges.

This operation forms lugs or burrs 66 as shown in Figure 10, which prevent the washer from slipping off the screw in subsequent handling. The receding portion 63 of cam 38 then rides under the roller 37, to bring the narrow neck 44 of the ram between the roller 45, whereupon the springs 28 spread the cutting edges 27 far enough to permit the washer and screw to be pushed down between these edges by the continued descent of the pusher 22. In this movement the screw and washer spread and pass the fingers 51 and 50 respectively. It will be understood that the cam 38 is so constructed and positioned relatively to the eccentrics 12 as to effect this sequence of operation. It will also be understood that the number of the jaws is variable according to the number of burrs necessary for maintaining the washer against slipping.

The ejected assemblies drop to the floor 31 and thence to the chute 34 from which they may be delivered to a receptacle or to another hopper, such as those referred to, for feeding to a screw driving machine.

The burrs 66 are preferably severed from the stock in such a manner that they will be laid flat when driven home. Thus, they are severed from the shank in the direction in which the screw or bolt is turned for assembly. This direction is the direction in which the screw thread winds from end to tip. The back of the burr, as distinguished from the cut or severed side is dragged into and along the wall of the hole and is thereby laid flat against the shank in substantially its original position.

Although a specific embodiment of the invention has been illustrated and described, it will be understood that various alterations in the details of construction may be made without departing from the scope of the invention as indicated by the appended claims.

What I claim is:

1. An assembling machine comprising a plurality of deforming jaws mounted to move towards and away from each other, a releasable support for a washer over said jaws, a releasable support for a screw in line with the first support, a pusher, means adapted to operate said pusher to insert a screw from the first support into a washer on the second support, and to move the screw and washer from said supports to a position wherein said jaws are adapted to support the washer thereon while the screw is suspended therebetween, means for forcing said jaws into the screw, and means for spreading the jaws sufficiently to permit the washer and screw to fall therebetween.

2. An assembling machine comprising a plurality of deforming jaws mounted to move towards and away from each other, a releasable support for a washer over said jaws, a releasable support for a screw in line with the first support, a pusher, means adapted to operate said pusher to insert a screw from the first support into a washer on the second support, and to move the screw and washer from said supports to a position wherein said jaws are adapted to support the washer thereon while the screw is suspended therebetween, means for forcing said jaws into the screw, and means for spreading the jaws sufficiently to permit the washer and screw to fall therebetween, and means included in said pusher operating means for continuing the movement of said pusher to eject said screw and washer from between said jaws.

3. An assembling machine comprising a plurality of deforming jaws mounted to move towards and away from each other, a resilient support for a washer over said jaws, a resilient support for a screw in line with the first support, a pusher, means operating said pusher to spring said screw and washer out of their respective supports into assembled relation and to a position wherein said jaws are adapted to support the washer thereon while the screw is suspended therebetween, means for forcing said jaws into the screw, and means for spreading the jaws sufficiently to permit the washer and screw to fall therebetween.

4. An assembling machine comprising a plurality of deforming jaws mounted to move towards and away from each other, a resilient support for a washer over said jaws, a resilient support for a screw in line with the first support, a pusher, means operating said pusher to spring said screw and washer out of their respective supports into assembled relation and to a position wherein said jaws are adapted to support the washer thereon while the screw is suspended therebetween, means for forcing said jaws into the screw, and means for spreading the jaws sufficiently to permit the washer and screw to fall therebetween, and said pusher operating means including means included in said pusher operating means for continuing the movement of said pusher to eject said screw and washer from between said jaws.

ROY W. BAILEY.